US012706826B2

(12) United States Patent
Daka et al.

(10) Patent No.: US 12,706,826 B2
(45) Date of Patent: Aug. 11, 2026

(54) GENERATING COLLECTORS FOR NETWORK RESOURCES

(71) Applicant: The Bank of New York Mellon, New York, NY (US)

(72) Inventors: Sreenivasa Daka, New York, NY (US); Brent Haley, New York, NY (US); Scott Pettyjohn, New York, NY (US); Austin Joseph, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 38 days.

(21) Appl. No.: 19/046,475

(22) Filed: Feb. 5, 2025

(65) Prior Publication Data

US 2026/0230418 A1 Aug. 6, 2026

(51) Int. Cl.
*G06F 15/16* (2006.01)
*H04L 41/0806* (2022.01)
(Continued)

(52) U.S. Cl.
CPC .......... *H04L 43/12* (2013.01); *H04L 41/0806* (2013.01); *H04L 43/045* (2013.01)

(58) Field of Classification Search
CPC .... H04L 43/12; H04L 41/0806; H04L 43/045
See application file for complete search history.

(56) References Cited

U.S. PATENT DOCUMENTS 7,239,250 B2 * 7/2007 Brian ..................... H04L 67/12 709/219
7,350,209 B2 3/2008 Shum
(Continued)

FOREIGN PATENT DOCUMENTS

CN 110502424 A 11/2019
CN 110781065 A 2/2020
(Continued)

OTHER PUBLICATIONS

China, Chrystal R. "What is application performance management (APM)? " https://www.ibm.com/topics/application-performance-management, accessed Sep. 10, 2024.
(Continued)

*Primary Examiner* — Normin Abedin
(74) *Attorney, Agent, or Firm* — NORTON ROSE FULBRIGHT US LLP

(57) ABSTRACT

Systems, methods, and computer-readable storage media for generating collectors for monitoring network resources are shown. In an aspect, the method includes determining a type of a network resource based at least in part on an identifier corresponding to the network resource. The network resource may be or include a database. The method includes generating a collector based on the identifier corresponding to the network resource; configuring functionality of the collector for monitoring the network resource based on the type of the network resource; monitoring, by the one or more processors, the network resource via the collector; and initiating, by the one or more processors, an action in the network based at least in part on the monitoring. In addition to supporting methods for generating and configuring collectors, some example embodiments enable functionality to decommission collectors and network resources, conserving energy and computing resources.

20 Claims, 4 Drawing Sheets

(51) Int. Cl.

*H04L 43/045* (2022.01)
*H04L 43/12* (2022.01)

(56) References Cited

U.S. PATENT DOCUMENTS

| | | | | |
|---|---|---|---|---|
| 7,490,323 | B2 | 2/2009 | D'Alo et al. | |
| 8,010,654 | B2 | 8/2011 | Hunt et al. | |
| 8,112,771 | B2 | 2/2012 | Bernabeu-Auban et al. | |
| 8,656,355 | B2 | 2/2014 | Oberlin et al. | |
| 9,356,883 | B1 * | 5/2016 | Borthakur | H04L 41/5025 |
| 10,212,031 | B2 | 2/2019 | Subramanian et al. | |
| 10,305,764 | B1 * | 5/2019 | Kshirsagar | H04L 43/50 |
| 10,469,330 | B1 | 11/2019 | Roth et al. | |
| 10,671,507 | B2 | 6/2020 | Prabath et al. | |
| 10,803,397 | B2 | 10/2020 | Desikachari et al. | |
| 10,884,805 | B2 | 1/2021 | Huang et al. | |
| 11,005,722 | B2 | 5/2021 | Valisammagari et al. | |
| 11,334,461 | B2 | 5/2022 | Kammath et al. | |
| 11,605,010 | B1 | 3/2023 | Kapoor | |
| 2014/0136680 | A1 * | 5/2014 | Joshi | H04L 43/026 709/224 |
| 2020/0106714 | A1 * | 4/2020 | Cote | H04L 47/83 |
| 2021/0073065 | A1 * | 3/2021 | Bhatnagar | G06F 11/079 |
| 2023/0188525 | A1 | 6/2023 | Singh et al. | |
| 2024/0259280 | A1 | 8/2024 | Stavisski et al. | |
| 2026/0121953 | A1 * | 4/2026 | Mullooly | H04L 43/065 |

FOREIGN PATENT DOCUMENTS

| | | |
|---|---|---|
| CN | 111200526 B | 9/2022 |
| CN | 116594740 A | 8/2023 |
| CN | 111190638 B | 3/2024 |

OTHER PUBLICATIONS

Arora, Harman, "Top 10 Application performance monitoring (APM) tools 2024," https://bigohtech.com/apm-monitoring-tools/, accessed Sep. 20, 2024.

* cited by examiner

GENERATING COLLECTORS FOR NETWORK RESOURCES

TECHNICAL FIELD

The present disclosure generally relates to network resource performance monitoring and more particularly to generating collectors for network resources, monitoring the network resources by the collectors, and/or resolving performance issues in the network resources based on the monitoring.

BACKGROUND

Application and production service teams need effective tools to monitor the performance of network resources, including databases, services, and applications operating in or on a network. One such tool that may be used is a collector which may include programmed functionality to access a network resource and collect data over a period of time from the network resource. For example, a collector may be configured to retrieve data and monitor performance of a network resource over a period of time. To be useful in monitoring a network resource's performance, collectors often need to be configured with credentials specific to the network resource and functionality specific to the type of network resource. While existing enterprise systems provide tools for viewing and managing collector data once the collectors are generated and configured, manual configuration of collectors is often still required and is a time consuming and error-prone process. Some automation alternatives attempt to launch monitoring tools by whether a network resource monitored by the tool is active. But such existing systems may be narrowly focused and limited in their general applicability to different types of network resources or even to variations within instances of the same type of network resource. Moreover, existing systems may not account for how collectors are to be handled during their lifetime and after they are no longer needed to monitor a network resource. For example, existing systems may require manual updates, manual maintenance, and manual decommission of collectors, many of which can take a significant amount of time to perform, and can tie up computing resources longer than is necessary, increasing inefficiencies and power consumption.

SUMMARY

To overcome the challenges described above, aspects of the present disclosure provide systems, methods, and computer-readable storage media providing functionality to support automated generation, configuration, and decommissioning of collectors for monitoring network resources.

In an aspect, a method includes determining a type of a network resource based at least in part on an identifier corresponding to the network resource. The network resource may be or include a database. The method includes generating a collector based on the identifier corresponding to the network resource and configuring functionality of the collector for monitoring the network resource based on the type of the network resource. Performance of the network resource may be monitored via the collector. Based on monitoring the network resource, the method may include initiating an action in the network based at least in part on the monitoring.

The disclosed systems and methods also provide functionality that supports automated reconfiguration of collectors for network resources or removal and decommission of the collectors. Other actions based on the monitoring may be initiated in the collectors, the network resource, the network, or elsewhere according to aspects of the present disclosure, which may improve the performance of the computing devices and network resources operating within the network.

The collector generation and configuration method described herein may enable automated systems for collector generation. Automation in this space reduces human error, and streamlines the initiation and decommissioning of collectors. This is particularly useful for network resources that are frequently updated or modified, as changes can be adapted for as needs arise. Automated generation and configuration of collectors allows for more flexible and more efficient network resource management. Automated decommissioning and removal of inactive collectors for network resources allows for the improved conservation of computing resources—including memory usage, processing load, network bandwidth, data storage, and electrical power consumption—and more optimal deployment of monitoring tools for network resources.

Using the aforementioned features, which are described in more detail below with reference to FIGS. 1-4, a system for generating collectors to monitor network resources, may be provided that enables several benefits and technical improvements. For example, automated generation and configuration of collectors may enable more accurate and complete monitoring of network resources, thus enabling application and production service teams to better manage network resources. The automated nature of the systems and methods discussed herein may reduce human error in the generation or operation of such collectors. Automation significantly reduces the time and effort required to set up and maintain network resource monitoring. The techniques described herein may also improve the consistency and scalability of monitoring functionality and tools.

A further benefit that may be achieved using the systems, methods, and computer readable media disclosed herein is an improvement in the cost effectiveness of monitoring systems, not only by reducing time and effort required to generate and configure collectors, but also by reducing waste in computing resources that may be tied up by the collectors. Systems, methods and computer-readable media for reallocating computing resources when they are no longer needed for monitoring network resources may result in improved computer functionality, including lower power consumption as unneeded collectors may be decommissioned.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
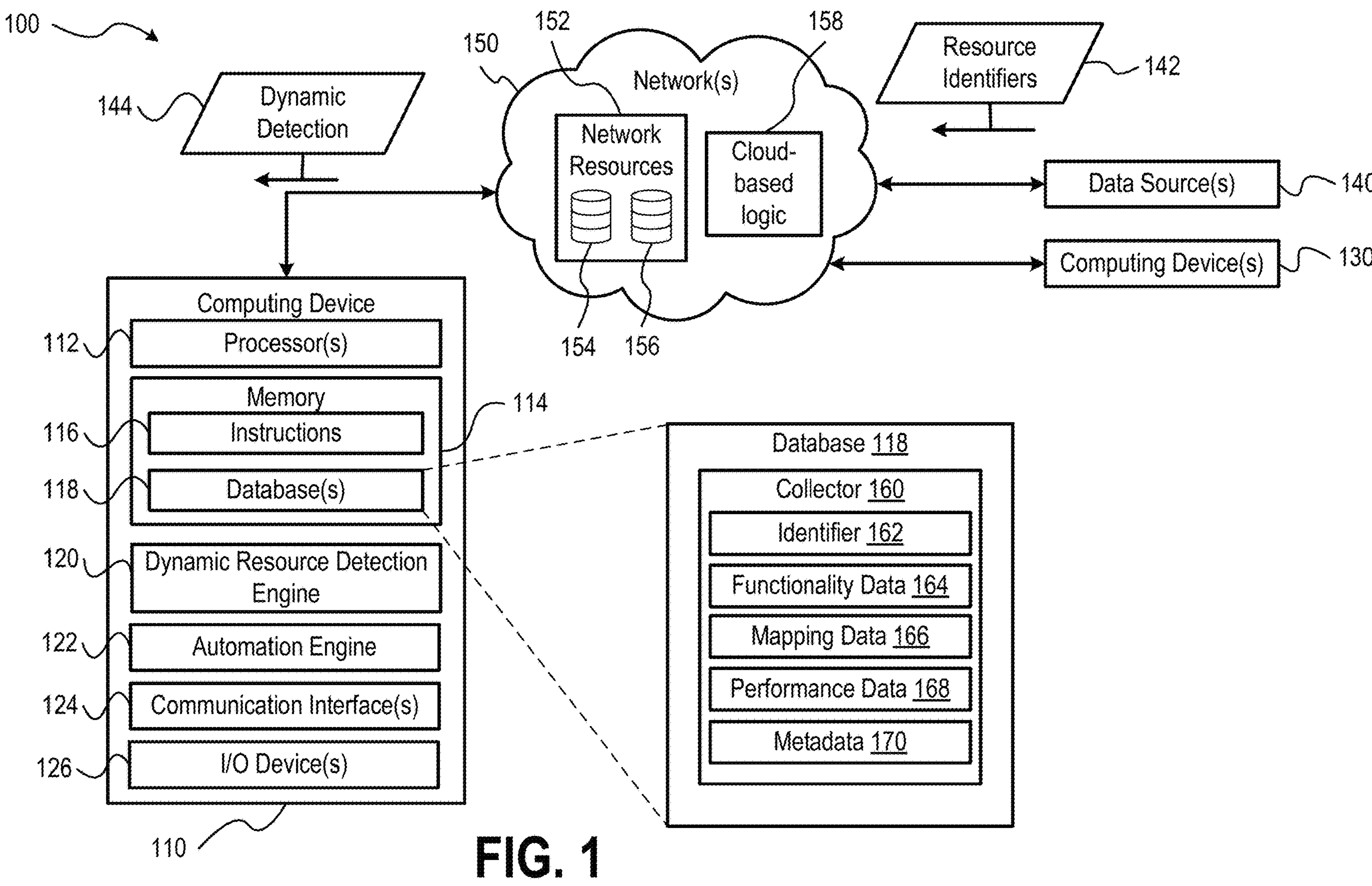
FIG. 1 is a block diagram illustrating an example system for generating collectors for monitoring network resources in accordance with aspects of the present disclosure.

Referring to FIG. 1, a block diagram illustrating an example system for generating collectors to monitor network resources in accordance with aspects of the present disclosure is shown as a system 100. As shown in FIG. 1, the system 100 includes a computing device 110. In an aspect, the functionality described with respect to the computing device 110 may be implemented via a cloud, as shown by cloud-based logic 158, rather than via a server or other type of computing device. Additionally or alternatively, functionality described with respect to the computing device 110 may be implemented via multiple computing devices (e.g., computing devices 130) or across a network 150. The computing device 110 includes one or more processors 112, a memory 114, one or more dynamic resource detection engines 120, one or more automation engines 122, one or more communication interfaces 124, and one or more input/output (I/O) devices 126. Each of the one or more processors 112 may be a central processing unit (CPU), a graphics processing unit (GPU), or other computing circuitry (e.g., a microcontroller, one or more application specific integrated circuits (ASICs), and the like) and each processor 112 may have one or more processing cores.

The memory 114 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices. The memory 114 may store instructions 116 that, when executed by the one or more processors 112, cause the one or more processors 112 to perform the operations described in connection with the computing device 110 with reference to FIGS. 1-4. The memory 114 may also store one or more databases 118 configured to store data used to generate and/or configure one or more collectors 160 corresponding to one or more network resources in the network 150 (e.g., network resources 152). The one or more communication interfaces 124 may be configured to communicatively couple the testing device 110 to the one or more networks 150 via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). The I/O devices 126 may include one or more display devices, a keyboard, a stylus, one or more touchscreens, a mouse, a trackpad, a camera, one or more speakers, haptic feedback devices, or other types of devices that enable a user to receive information from or provide information to the computing device 110.

The one or more dynamic resource detection engine(s) 120 may be configured to provide functionality to support processes for monitoring network resources in accordance with the concepts described herein. As used herein, network resources 152 (e.g., including network resources 154 and 156) may include databases, applications, services, cloud applications or functions, cloud databases (e.g., databases as a service or "DBaaS"), network elements (e.g., routers, switches, servers, etc.), web pages, or other network components and functionality. The dynamic resource detection engine(s) 120 may be configured to provide functionality to dynamically detect network resources 152 in the network 150, illustrated as dynamic detection 144. Examples of dynamic detection 144 performed by the dynamic resource detection engine(s) 120 may include probing the network 150 to determine availability, interactivity, performance, monitoring status, credentials, or other aspects of the network resources 152. Dynamically detecting availability of a network resource may include probing to verify a database is online and accessible or that a service or network application is accessible. Dynamically detecting interactivity of a network resource may include probing to test functionality provided by the network resource, such as to test whether information can be read from or written to a database or functionality of an application is operational (e.g., because a service may be available or accessible, but may not be fully functional). Dynamically detecting performance of a network resource may include probing the network resource to test performance of the network resource, such as to test latency during communication with a network resource, load balancing functionality within a network element, or other types of performance metrics. Dynamically detecting the monitoring status of a network resource may include probing the network resource to determine whether the network resource Dynamic detection 144 may include probing the network 150, the network resources 152, or one or more data sources 140 for identifiers of the network resources (e.g., resource identifiers 142). Each of the network resources 152 may have a type, and a resource identifier 142 corresponding to the network resource may identify the type of the network resource. For example, the network resource 154 may be a database and the network resource 156 may be an application. In this example, identifiers corresponding to each of the network resources 154 and 156 may respectively identify the network resource 154 as a database and the network resource 156 as an application. In an alternate example, the network resource 154 may be a database and the network resource 156 may be a different type of database, and resource identifiers 142 corresponding each of the network resource 154 and the network resource 156 may respectively identify the type of database that the corresponding network resource is. These examples are intended to be illustrative and not limiting. As one of ordinary skill in the art would readily recognize from this disclosure, there are many possible types of network resources 152 that would each have their own functionality, credentials, inputs, outputs, data sources, network connections, update schedules, monitoring capabilities, performance metrics, domain, and the like. There may be at least some overlap in functionality between some types of network resources, or there may be no overlap at all. If two network resources are of the same type, they may have the same type of functionality, but other features may be different. The resource identifiers 142 may be configured to identify a type of the corresponding network resource. Additionally or alternatively, the resource identifiers 142 may be configured to identify functionality, configurations, credentials, availability, performance metrics, data sources, hosting information or other features of the network resource. According to some aspects, the resource identifiers 142 may identify all, some, only one, or none of the above features corresponding to their respective network resource. If the network resource becomes decommissioned or otherwise unavailable on the network 150, a corresponding resource identifier may be removed from the data source 140.

The automation engine 122 may be configured to generate a collector (or multiple collectors) 160 for monitoring the network resources 152. As used herein, a collector may include programmed functionality to access, connect to, query, monitor, retrieve data from, process data from, or collect data over a period of time from one or more network resources. When network resources are initially configured, they may be provided with a set of one or more credentials that may define permissions needed to access or use the network resource. When a collector 160 is generated for a network resource, it may be configured to access and/or monitor the network resource. Collector(s) 160 for the network resources 152 may be configured with the same credentials or permissions as their corresponding network resources so that they can be used to connect to, query, monitor, retrieve data from, or otherwise access a corresponding network resource. Such credentials may be obtained, received, detected, or determined by dynamic resource detection engine 120. For example, the credentials and other configurations for the collectors may be included in, identified by, or otherwise made available by the resource identifiers 142. In an aspect, the automation engine 122 may generate a collector 160 in response to or based on receiving a resource identifier 142 corresponding to a network resource of the network resources 152.

Collectors 160 may be generated (e.g., instantiated) based on data related to the network resources 152. For example, data for generating instances of collectors 160 may be stored in a memory 114, such as in the one or more databases 118, at another computing device 130, or at another location in the network 150. For illustrative purposes, database 118 is shown as including some of the kinds of data that may be used to generate and configure the collectors 160, including identifier data 172, functionality data 174, mapping data 176, and performance data 178. The kinds of data shown here are examples and are not intended to limit the kinds of data that may be stored in database 118 and/or used to generate, configure, or operate collectors 160. The data included in database 118 may be received from the data sources 140, may be obtained from the network resources, may be generated by the one or more processors 112, or may be received from some other source through the network 150.

Identifier data 172 may be received from the resource identifiers 142, and may correspond to network resources 152. For example, the identifier data 172 may include type data for the network resources 152. Database 118 may include functionality data 174. Functionality data 174 may include or refer to functionality performed by network resources 152, functionality for monitoring the network resources 152 (e.g., for monitoring performance metrics of the particular network resource), functionality for accessing the network resources 152, functionality for generating, configuring, or operating collectors, or some combination of these or other functionalities. Specific types of network resources may use specific functionalities. Database 118 may be configured to associate specific types of network resource with specific functionalities. For example, functionality data 174 may include templates for collectors that include the kinds of functionalities associated with specific types of network resources. Additionally or alternatively, functionality data 174 may include a library of different functionalities. For example, type data from identifier data 172 may indicate the kinds of functionalities from the library of functionalities to be included in collectors for a type of network resource.

Mapping data 176 may include data associating the functionality data 174 with the type of the network resources 152. For example, mapping data 176 may enable specific functionalities of the functionality data 174 to be mapped to a particular type of network resource. Different types of network resources may perform different functions and may be monitored by different kinds of functions or different metrics. Even the same or similar types of network resources may have specific functionalities that require individual configuration of instances of collectors for those network resources. Mapping data 176 may enable the functionality (e.g., functionality data 174) associated with a specific network resource to be associated with a collector 160 configured to monitor that specific network resource. Instantiating collectors based on mapping data 176 may provide the benefit of making changes or updates to functionality of collectors in a single place (i.e., the functionality data 174) and then the updated or changed functionality may be deployed to all collectors by simply re-instantiating the collectors associated with the modified functionality, thereby enabling updates within the set of deployed collectors to be more efficiently deployed.

An example collector 160 is illustrated as collector 162. Although illustrated here as a single collector 162 for simplicity, a person of ordinary skill in the art would recognize that multiple collectors may be instantiated to monitor multiple network resources. Collector 162 may be configured for monitoring a particular network resource of the network resources 152. Collector 162 may be configured to include or receive data corresponding to the particular network resource. The data included in collector 162 may be received from the data sources 140, may be obtained by monitoring the particular network resource (e.g., using particular functionality corresponding to the particular network resource), or may be generated by the one or more processors 112. Collector 162 may be configured based on an identifier 164 corresponding to the particular network resource. The identifier 164 may be received as one of the resource identifiers 142, corresponding in this case to the particular network resource. For example, the identifier 164 may include the type of the particular network resource (illustrated here as type data 168). Alternatively, the identifier 164 may indicate the type of the particular network resource without separately including type data 168. Collector 162 may include functionality 166. Functionality 166 may include or refer to functionality for monitoring or otherwise interacting with the particular network resource (e.g., for monitoring performance metrics of the particular network resource or for other purposes), functionality for accessing the particular network resource, functionality for determining whether the particular network resource is active, functionality for initiating a transaction with the particular network resource, functionality for supporting operations of the collector 162, or some combination of these or other functionalities.

Collector 162 may be configured to receive or generate performance data 178 corresponding to the particular network resource. While performance data 178 is illustrated as being stored in database 118, performance data 178 may be retrieved or monitored directly by collector 162 from the particular network resource (e.g., one of network resources 152). The performance data 178 may be received using the functionality 166. The performance data 178 may be obtained by the collector 162 through a monitoring function in the functionality 166, or the performance data 178 may be reported to the collector 162 through a reporting function of the particular network resource, or both. According to some aspects, the collector 162 may be configured to retrieve or obtain the performance data 178 at regular intervals (e.g., through scheduled executions of performance monitoring scripts, functions, and/or programs). For example, scheduling the monitoring functionality of the collector 162 to execute at regular intervals may be done based on metadata 170 or using a task scheduler, non-limiting examples of which include cron on Unix-based systems or Task Scheduler on Windows. Additionally or alternatively, the performance data 178 may be retrieved by the collector 162 outside of a regularly scheduled interval, in response to a trigger event of some kind. As a few illustrative examples, the performance data 178 may be retrieved in response to an external alert (e.g., an alert of the network resource going offline), in response to a user input, in response to some criteria being met (e.g., a criteria related to one or more metrics monitored at the network resource), or a threshold crossed (e.g., an increase in the load of the network resource exceeding a threshold). Other examples would be readily understood by a person of skill in the art. Collector 162 may also include metadata 170, which may be metadata of the network resource, metadata of the collector, or some other metadata. For example, metadata 170 may include information related to when the collector 162 was instantiated, how long the collector 162 has been active, and so on.

Figure 2:
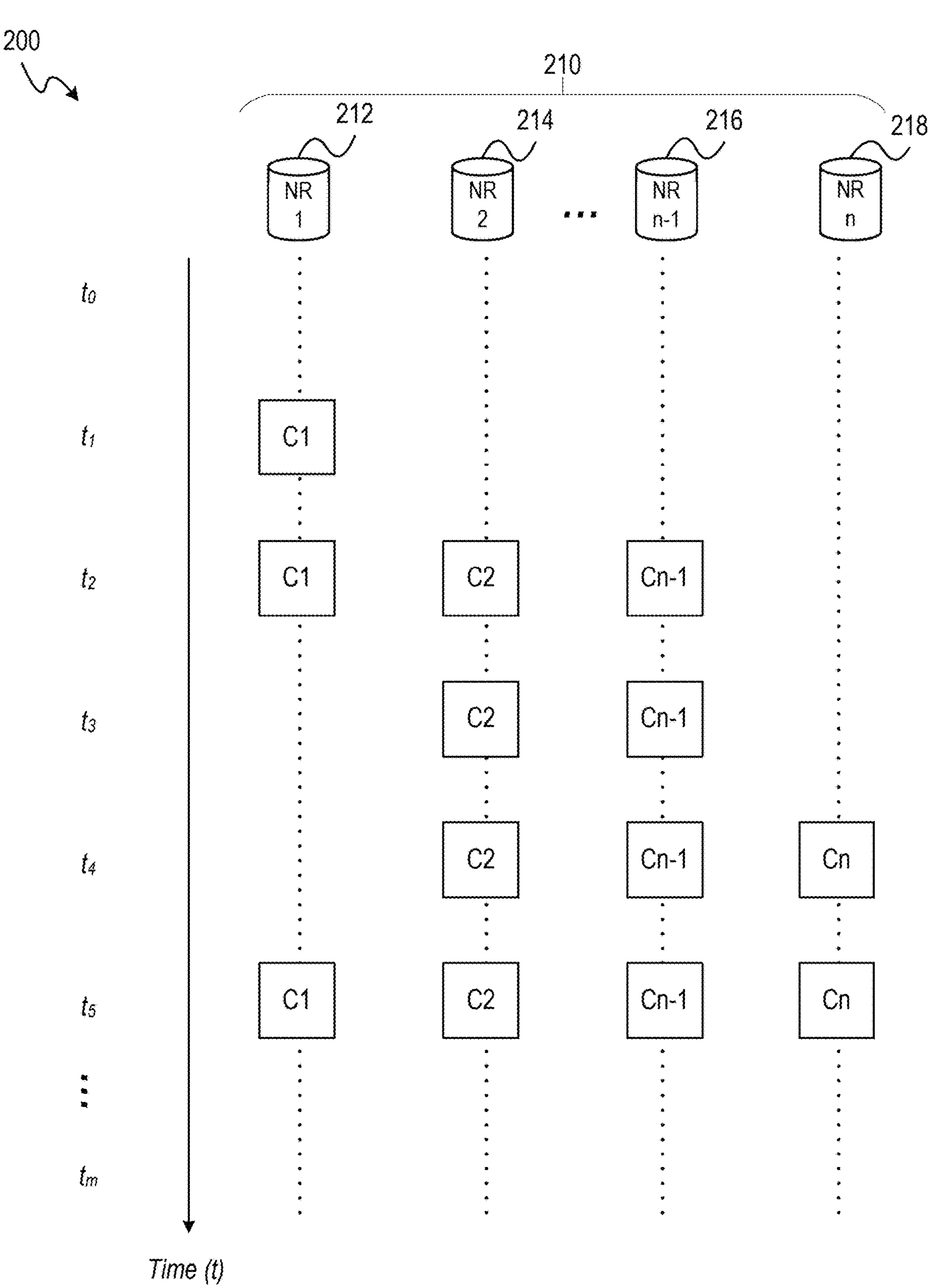
FIG. 2 is a block diagram illustrating an example of timing for generation and decommissioning of collectors corresponding to network resources in accordance with aspects of the present disclosure.

FIG. 2 is a block diagram illustrating an example of timing for generation and decommissioning of collectors corresponding to network resources in accordance with aspects of the present disclosure as timing diagram 200. In timing diagram 200, a plurality of network resources 210 may exist on the network 150. The plurality of network resources 210 may include or correspond to the network resources 152 illustrated in FIG. 1. For example, the plurality of network resources include a first network resource 212, a second network resource 214, and so on up to an n−1 network resource 216 and an nth network resource 218. These network resources 210 may exist on the network 150 in one or more states of configuration. In some aspects, the network resources 210 may be different types, the same type, or some combination thereof. The network resources 210 may each be identified by identifiers that identify the network resources and the respective type of the network resources 210. At time to, there may be no collectors instantiated for any of the network resources 210. For example, at time to, none of the network resources 210 may be available for monitoring, or to may be a time before the system 100 begins to generate or configure collectors. At time to, because no collectors have yet been generated, all computing resources that would be associated with the collectors (e.g. system memory, processor power, network bandwidth, electrical power, and so on) may be available for use.

At time $t_1$, a collector C1 may be generated and configured to collect data from the first network resource 212 (e.g., to monitor the first network resource 212). Collector C1 may be generated based on an identifier corresponding to the first network resource 212. The identifier may enable determining the type of the first network resource 212. Collector C1 may be configured based the type of the first network resource 212. For example, collector C1 may include functionality particular to the type of the first network resource 212. Assuming for purposes of illustration that collector C1 is the only collector instantiated at t time $t_1$, an amount of computing resources proportional to the collector C1 would then be in use by the collector C1 (or by the system to generate, configure, and maintain the collector C1), but other computing resources would remain available for other purposes, including for later instantiation of other collectors.

At time $t_2$, Collectors C2 and Cn−1 may be generated respectively for the second network resource 214 and the n−1 network resource 216. Collectors C2 and Cn−1 may be generated based on respective identifiers corresponding to each of the second network resource 214 and the n−1 network resource 216. Collectors C2 and Cn−1 may be configured based on the respective types of the second network resource 214 and the n−1 network resource 216. For example, collector C2 may include functionality particular to the type of the second network resource 214 and collector Cn−1 may include functionality particular to the type of the n−1 network resource 216. As noted above, the functionality of the collectors may overlap with each other, or the functionality of the collectors may have some overlap or no overlap. The specific configurations of functionality may depend on the monitoring requirements or capabilities of the specific network resources. Such functionality may be determined based at least in part on the respective identifiers corresponding to the network resources. Note that the collector C1 is still being maintained or operated at time $t_2$, so the total computing resources in use at time $t_2$ may correspond to the total computing resource needs of the several collectors.

At time $t_3$, the collector C1 may no longer be needed, and so is removed or decommissioned. For example, collector C1 may no longer be needed because the first network resource 212 may no longer be in active use, or other network resources, applications, or services may no longer depend on the first network resource 212, the first network resource 212 may not need to be monitored any longer, or the identifier corresponding to the first network resource 212 may be removed from a data source. When the collector C1 is decommissioned, the computing resources it was using would then become available for some other use, such as the instantiation of other collectors, or for other related or unrelated computing tasks, for example. Collectors C2 and Cn−1 may remain maintained by the system at time $t_3$.

At time $t_4$, collector Cn may be generated and configured in a similar manner to the other collectors discussed above. This example is provided to illustrate that collectors may be generated and configured as needed by the system. For example, in response to receiving or determining the type of the nth network resource 218, the system may generate collector Cn based on an identifier corresponding to the nth network resource 218 and configure collector Cn based on the type of the nth network resource 218. At time $t_5$, the C1 collector may be generated again. This example is provided to illustrate that collectors may be reinstantiated if needed, even after being removed. In this way, the systems and methods described herein can be performed in a flexible manner, adapting to the monitoring needs of the system and the network resources.

At time $t_m$, all of the collectors may be decommissioned or removed from operation. This example illustrates that when all collectors are no longer in use, the computing resources taken up by the collectors C1 through Cn would no longer be tied up, but would become available for other computing needs, whether on the network 150 or locally at the computing device 110. For example, time $t_m$ may correspond to a time when the network resources are no longer being actively monitored. Of course, in many applications, there may not be a single time $t_m$ when all collectors are removed and the corresponding computing resources are released, but it is expected that systems implemented in accordance with this disclosure may both add and remove collectors over time. This example at time $t_m$ serves then to illustrate the idea that as collectors are decommissioned and removed from operation their corresponding computing resources may be returned to availability.

Figure 3:
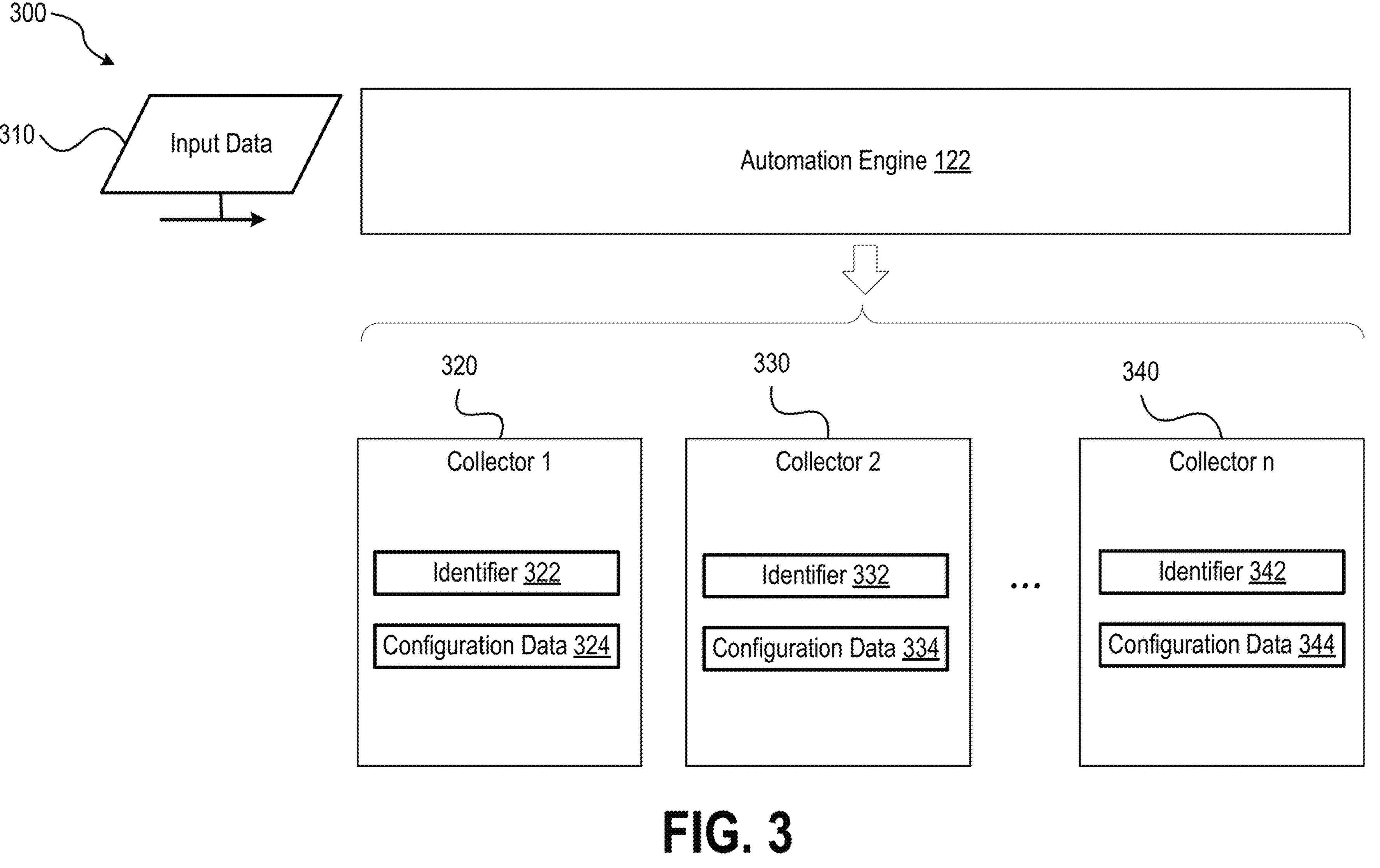
FIG. 3 shows an example of configuring collectors for network resources in accordance with aspects of the present disclosure.

FIG. 3 shows an example of configuring collectors for network resources in accordance with aspects of the present disclosure as an automation process 300. For example, FIG. 3 illustrates how automation engine 122 may receive input data 310 and therefrom generate and configure a plurality of collectors, including first collector 320, second collector 330, and so on up until nth collector 340. Each collector generated by the automation engine 122 may be generated in a manner consistent with the methods and systems discussed above (e.g., in like manner to that as discussed with reference to collector 162).

Collectors 320, 330, and 340 may each be configured for monitoring a particular network resource of the network resources 152 based on the input data 310. Collector 320 may be configured to include data corresponding to the particular network resource. The data included in collector 320 may be received as part of the input data 310, or may be determined based on the input data 310. Input data 310 may include data regarding the type and functionality of each network resource of a plurality of network resources 152 on the network 150. For example, the input data 310 may include resource identifier data for the network resources. Input data 310 may further include configuration data 324, such as functionality data, mapping data, monitoring data, credentials data, performance data, metadata, or other kinds of relevant data for the respective network resources, the collectors, the system, or some combination thereof.

Collectors 330 and 340 may be configured similarly to the collector 320 using the input data 310 to configure collectors 330 and 340 based on respective identifiers (e.g., identifiers 332 and 342) and including configuration data (e.g., configuration data 334 and 344), which may correspond to their respective network resources.

The automation process 300 may be performed by the automation engine 122. According to some aspects, the automation engine 122 may be designed to have knowledge of available monitoring functionality that may be built into collectors for each different type of network resource to be monitored. For example, a first type of network resource (e.g., a database) may have predefined monitoring functions x, y, and z. In the same example, a second type of network resource (e.g., a second type of database) may have predefined monitoring functions u, v, and w. Monitoring functions u, v, and w may overlap with or be completely distinct from monitoring functions x, y, and z. Collectors for resources associated with the first type of network resource may be instantiated with functionality x, y, z and collectors for resources associated with the second type of network resource may be instantiated with functionality u, v, w.

The automated process 300 may include iterating over the plurality of network resources to generate and configure a corresponding collector for each network resource. For example, the input data 310 may be received by the automation engine 122 by querying a rest end point for the network resources (e.g., the individual URL or entry points for accessing the network resources). The query may return identifiers for each network resource. Then, for each network resource, automation engine 122 may generate and configure a collector corresponding to the identifier and the type of the network resource. Configuring the collector may include providing the collector with connection details, credentials, and the metrics to be monitored by the collector. For example, configuring the collector may include providing the collector with credentials specific to the network resource. According to some implementations, the automated process 300 may be performed using an application performance monitoring system.

The automation engine 122 may be operated a first time as part of an initial generation and configuration of collectors for the network resources. The automation engine 122 may further be operated continuously on data corresponding to the collectors, or may be operated at regular intervals (e.g., every 24 hours), or may be operated based on a triggering event. As a few illustrative examples, the automation engine 122 may be operated in response to an external alert, in response to a user input, in response to some criteria being met, or in response to a threshold being crossed. Although not illustrated in FIG. 3, the automation engine 122 may also be configured to remove the collectors when they are no longer needed, thus freeing up computing resources associated with the collectors while they were operating.

One example of a type of network resource for which a collector may be generated is an Oracle resource type (e.g., an Oracle database). Functionality for a collector for an Oracle resource may include query performance monitoring. For example, a collector may be configured with functionality to monitor the execution time and resource consumption of SQL queries to identify slow-running queries and optimize them for better performance. Additionally or alternatively, functionality for an Oracle resource collector may include tablespace usage monitoring. For example, a collector may be configured to track the usage and availability of tablespaces to prevent issues related to storage capacity and ensure smooth database operations.

Another example of a type of network resource for which a collector may be generated is a MSSQL resource (e.g., a MSSQL database). Functionality for a collector for a MSSQL resource may include deadlock monitoring. For example, a collector may be configured with functionality to monitor and detect deadlocks in the database to identify and resolve conflicts that can cause application performance issues. Additionally or alternatively, functionality for a collector for a MSSQL resource may include index fragmentation tracking. For example, a collector may be configured to track the fragmentation levels of indexes to maintain optimal query performance and reduce the need for full table scans.

Another example of a type of network resource for which a collector may be generated is a Mongo resource (e.g., a Mongo database). Functionality for a collector for a Mongo resource may include replica set health monitoring. For example, a collector may be configured with functionality to monitor the status and health of replica sets to ensure data redundancy and high availability of the database. Additionally or alternatively, functionality for a collector for a Mongo resource may include memory usage tracking. For example, a collector may be configured with functionality to track the memory usage of MongoDB instances to prevent memory-related issues and ensure efficient resource utilization.

The above types of network resources are provided as illustrative examples only, and are not intended to limit the types of resources or functionalities to which the systems and methods of the present disclosure may be applied. A person of ordinary skill in the art would recognize that collectors for other types of resources may also be implemented using techniques and methods such as those described herein.

Figure 4:
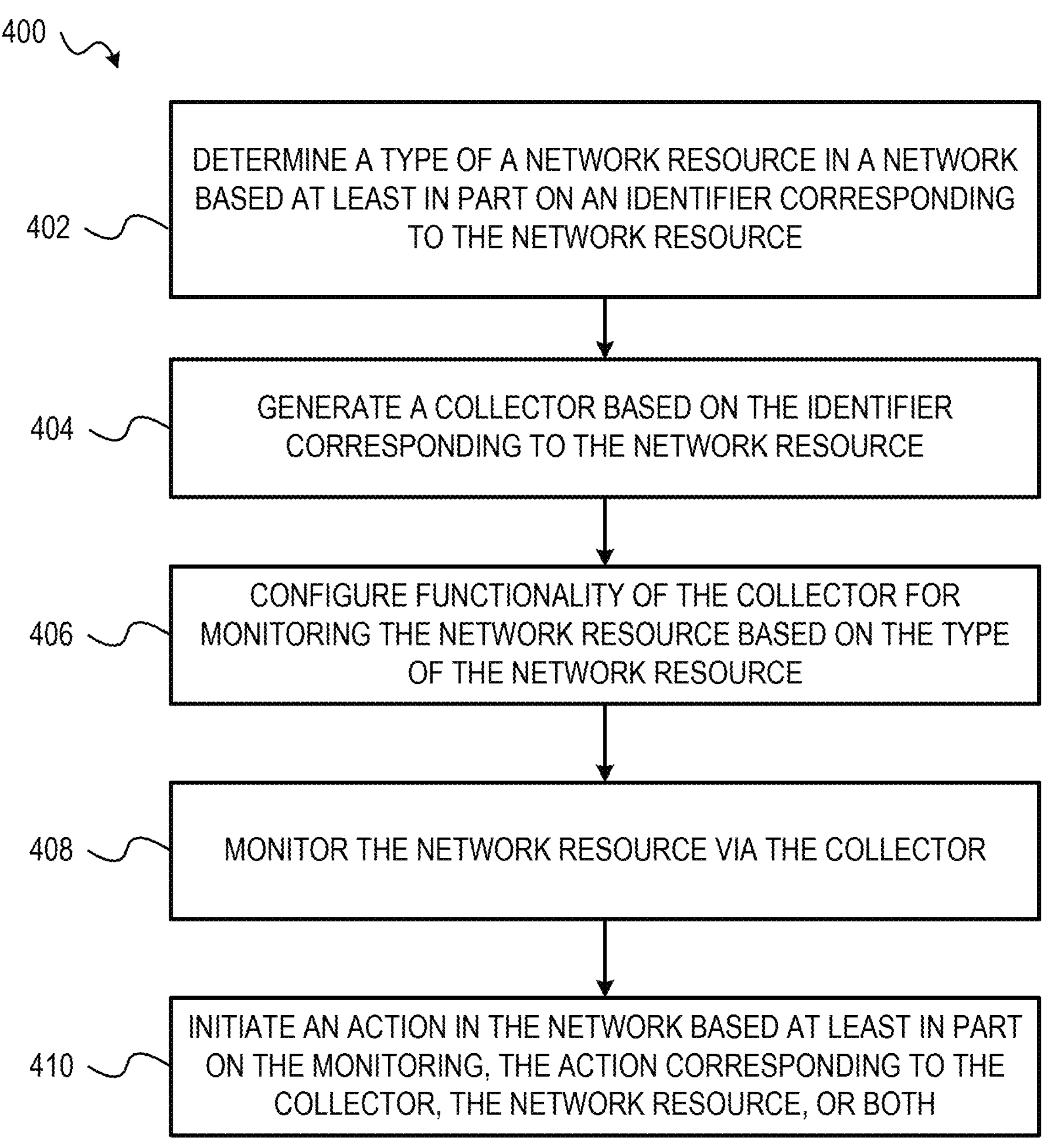
FIG. 4 shows an example process for generating collectors corresponding to network resources and monitoring the network resources via the collectors in accordance with aspects of the present disclosure.

FIG. 4 shows an example process for generating collectors corresponding to network resources and monitoring the network resources via the collectors in accordance with aspects of the present disclosure as process 400. The process 400 may be performed by one or more processors (e.g., processor(s) 112) executing code stored on a memory (e.g., memory 114), by the dynamic resource detection engine 120, by the automation engine 122, by cloud-based logic (e.g., cloud-based logic 154), or by some combination thereof. At step 402, the process 400 includes determining a type of a network resource in a network based at least in part on an identifier corresponding to the network resource, wherein the network resource comprises a database. Determining the type of network resource may include querying the network resource directly. Alternatively, determining the type of the network resource may include receiving information or data from one or more data sources. For example, an identifier of the network resource may be received from one or more data sources (e.g., data source(s) 140). The identifier may enable determining the type of the network resource. In some implementations, the network resource may be or include a database. Alternatively, the network resource may be or include an application, a service, a cloud application or function, a cloud database, network elements (e.g., routers, switches, servers, etc.), a web page, or other network components and functionality. The network may include a plurality of network resources of different types. For example, the network may include a plurality of databases having different types. The network resource may have a type included in the different types of network resources.

At step 404, the process 400 includes generating a collector based on the identifier corresponding to the network resource. At step 406, the process 400 includes configuring functionality of the collector for monitoring the network resource based on the type of the network resource. The identifier may provide information to an automation engine identifying the network resource and/or the type of the network resource, and information for instantiating a collector for monitoring the network resource, including configuration information for the collector. Alternatively, the identifier may identify only the type of the network resource, and other functionality (e.g., functionality included in the automation engine 122) may determine to generate and configure the collector based on predetermined functionality associated with the type of network resource.

At step 408, the process 400 includes monitoring the network resource via the collector. Monitoring the network resource may include performing status checks of the network resource at regular intervals. Monitoring the network resource may include executing functionality in the collector to retrieve performance data for the network resource. Monitoring the network resource may further include analyzing the performance data for the network resource to determine whether to undertake one or more actions in the network. For example, if the performance data indicates that the network resource is performing poorly or performing unexpectedly, an action may be undertaken to mitigate the poor or unexpected performance. At step 410, the process 400 includes initiating an action in the network based at least in part on the monitoring, the action corresponding to the collector, the network resource, or both. The action may include one or more of the following non-limiting examples: restarting the network resource (or the device the network resource is hosted on for application, services, or databases); removing, decommissioning, or reconfiguring the collector; reconfiguring a computing resource corresponding to the network resource (e.g., reallocating memory, providing additional processing resources, closing ancillary programs running on the computing resource or other programs that may be impacting the performance of the network resource); initiating a backup procedure; rerouting some or all of the traffic to the network resource to a secondary or backup network resource; providing a recommendation (e.g., a ranked recommendation) of potential actions that may be undertaken; displaying information related to the network resource's performance; outputting an alert or a flag of the performance data for human review; some combination of any of the above; or some other action based on the monitoring. In some implementations, the action may include displaying, by one or more processors, one or more metrics corresponding to the performance of the network resource to a display device. In some implementations, the action may include restarting a computing device hosting the network resource, reconfiguring one or more computing resources associated with the network resource, or both.

The process 400 may include other steps not shown in FIG. 4. For example, the process 400 may include dynamically detecting the network resource on the network by probing the network to identify one or more indications of the network resource; and configuring the collector based on the one or more indications.

In some implementations, the process 400 may include removing the collector. Removing the collector may include decommissioning the collector. According to aspects, removing the collector releases one or more computing resources. Removing the collector may be based on dynamically detecting that the network resource is no longer available. Removing the collector may be based on dynamically detecting that the network resource is not functioning as expected. Removing the collector may be based on a change in metrics corresponding to performance of the network resource, based on the identifier being removed from a list of identifiers, based on the identifier being removed from a data source providing the identifier, or a combination thereof.

The method 400 may include a step for determining that a data source associated with the identifier is operating unexpectedly; and maintaining the collector corresponding to the identifier at least until the data source again operates as expected or until the network resource is determined to not be available. A data source not operating as expected may include when the data source is down, when the data source is not providing accurate or up-to-date information, or is otherwise not available. A reason to maintain the collector even when the data source is not performing as expected is because it is possible that the network resource is still operating as expected even if a data source for the identifier is down. In some instances, a thresholding function may be applied to determine whether to maintain collectors when a data source for identifiers is not operating as expected. For example, if a plurality of collectors were in place to monitor a plurality of databases (or other network resources as the case may be), and the databases were performing normally according to the performance data collected by the collectors, and suddenly a large proportion (e.g., greater than a threshold) of the identifiers for the plurality of databases were no longer available, it is possible that the data source for the identifiers went down and that the databases themselves are still functioning as expected. In such a case as this, maintaining the collectors may be more useful than removing them and then reconfiguring the collectors once the identifier data source is back online.

According to some implementations, configuring the functionality of the collector (e.g., as in step 406) may include selecting functionality specific to the type of the network resource. In such implementations, different collector configurations comprising different functionality may be selected for different types of network resources.

The method steps described herein with respect to FIG. 4 may be stored as instructions in a memory coupled to one or more processors, such that when the one or more processors execute the instructions, the method steps are performed by the one or more processors. Additionally or alternatively, the instructions may be stored on a computer readable medium.

Non-limiting aspects include the following aspects. Aspect 1: A method, comprising: determining, by one or more processors, a type of a network resource in a network based at least in part on an identifier corresponding to the network resource, wherein the network resource comprises a database, wherein the network comprises a plurality of databases having different types, the different types comprising the type of the network resource; generating, by the one or more processors, a collector based on the identifier corresponding to the network resource; configuring, by the one or more processors, functionality of the collector for monitoring the network resource based on the type of the network resource; monitoring, by the one or more processors, the network resource via the collector; and initiating, by the one or more processors, an action in the network based at least in part on the monitoring, the action corresponding to the collector, the network resource, or both.

Aspect 2: The method of aspect 1, further comprising: dynamically detecting the network resource on the network by probing the network to identify one or more indications of the network resource; and configuring the collector based on the one or more indications.

Aspect 3: The method of any one of aspects 1 to 2, wherein the action comprises displaying, by the one or more processors, one or more metrics corresponding to performance of the network resource to a display device.

Aspect 4: The method of any one of aspects 1 to 3, wherein the action comprises restarting a computing device hosting the network resource, reconfiguring one or more computing resources associated with the network resource, or both.

Aspect 5: The method of any one of aspects 1 to 4, further comprising removing the collector.

Aspect 6: The method of aspect 5, wherein removing the collector releases one or more computing resources.

Aspect 7: The method of any one or aspects 5 to 6, wherein the collector is removed based on dynamically detecting that the network resource is no longer available.

Aspect 8: The method of any one or aspects 5 to 7, wherein the collector is removed based on a change in metrics corresponding to performance of the network resource, based on the identifier being removed from a list of identifiers, based on the identifier being removed from a data source providing the identifier, or a combination thereof.

Aspect 9: The method of any one or aspects 1 to 8, further comprising: determining that a data source associated with the identifier is operating unexpectedly; and maintaining the collector corresponding to the identifier at least until the data source again operates as expected or until the network resource is determined to not be available.

Aspect 10: The method of any one or aspects 1 to 9, wherein configuring functionality of the collector further comprises selecting functionality specific to the type of the network resource, wherein different collector configurations comprising different functionality are selected for different types of network resources.

Aspect 11: A system, comprising: a memory storing processor-readable code; and one or more processors coupled to the memory, the one or more processors configured to execute the processor-readable code to cause the one or more processors to perform operations including: determining a type of a network resource in a network based at least in part on an identifier corresponding to the network resource, wherein the network resource comprises a database, wherein the network comprises a plurality of databases having different types, the different types comprising the type of the network resource; generating a collector based on the identifier corresponding to the network resource; configuring functionality of the collector for monitoring the network resource based on the type of the network resource; monitoring the network resource via the collector; and initiating an action in the network based at least in part on the monitoring, the action corresponding to the collector, the network resource, or both.

Aspect 12: The system of aspect 11, the operations further comprising: dynamically detecting the network resource on the network by probing the network to identify one or more indications of the network resource; and configuring the collector based on the one or more indications.

Aspect 13: The system of any one of aspects 11 to 12, wherein the action comprises displaying one or more metrics corresponding to performance of the network resource to a display device.

Aspect 14: The system of claim of any one of aspects 11 to 13, wherein the action further comprises restarting a computing device hosting the network resource, reconfiguring one or more computing resources associated with the network resource, or both.

Aspect 15: The system of any one of aspects 11 to 14, further comprising removing the collector.

Aspect 16: The system of aspect 15, wherein removing the collector releases one or more computing resources.

Aspect 17: The system of any one of aspects 15 to 16, wherein the collector is removed based on dynamically detecting that the network resource is no longer available.

Aspect 18: The system of any one of aspects 15 to 17, wherein the collector is removed based on a change in metrics corresponding to performance of the network resource, based on the identifier being removed from a list of identifiers, based on the identifier being removed from a data source providing the identifier, or a combination thereof.

Aspect 19: The system of any one of aspects 11 to 18, further comprising: determining that a data source associated with the identifier is operating unexpectedly; and maintaining the collector corresponding to the identifier at least until the data source again operates as expected or until the network resource is determined to not be available.

Aspect 20: The system of any one of aspects 11 to 19, wherein configuring functionality of the collector further comprises selecting functionality specific to the type of the network resource, wherein different collector configurations comprising different functionality are selected for different types of network resources.

Aspect 21: A computer readable medium comprising code, which when executed by one or more processors, causes the one or more processors to perform operations corresponding to the method of any one of aspects 1 to 10.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method, comprising:

determining, by one or more processors, a type of a network resource in a network based at least in part on an identifier corresponding to the network resource, wherein the network resource comprises a database, wherein the network comprises a plurality of databases having different types, the different types comprising the type of the network resource;

generating, by the one or more processors, a collector based on the identifier corresponding to the network resource;

configuring, by the one or more processors, functionality of the collector for monitoring the network resource based on the type of the network resource;

monitoring, by the one or more processors, the network resource via the collector; and initiating, by the one or more processors, an action in the network based at least in part on the monitoring, the action corresponding to the collector, the network resource, or both.

2. The method of claim 1, further comprising:

dynamically detecting the network resource on the network by probing the network to identify one or more indications of the network resource; and configuring the collector based on the one or more indications.

3. The method of claim 1, wherein the action comprises displaying, by the one or more processors, one or more metrics corresponding to performance of the network resource to a display device.

4. The method of claim 1, wherein the action comprises restarting a computing device hosting the network resource, reconfiguring one or more computing resources associated with the network resource, or both.

5. The method of claim 1, further comprising removing the collector.

6. The method of claim 5, wherein removing the collector releases one or more computing resources.

7. The method of claim 5, wherein the collector is removed based on dynamically detecting that the network resource is no longer available.

8. The method of claim 5, wherein the collector is removed based on a change in metrics corresponding to performance of the network resource, based on the identifier being removed from a list of identifiers, based on the identifier being removed from a data source providing the identifier, or a combination thereof.

9. The method of claim 1, further comprising:

determining that a data source associated with the identifier is operating unexpectedly; and maintaining the collector corresponding to the identifier at least until the data source again operates as expected or until the network resource is determined to not be available.

10. The method of claim 1, wherein configuring functionality of the collector further comprises selecting functionality specific to the type of the network resource, wherein different collector configurations comprising different functionality are selected for different types of network resources.

11. A system, comprising:

a memory storing processor-readable code; and one or more processors coupled to the memory, the one or more processors configured to execute the processor-readable code to cause the one or more processors to perform operations including:

determining a type of a network resource in a network based at least in part on an identifier corresponding to the network resource, wherein the network resource comprises a database, wherein the network comprises a plurality of databases having different types, the different types comprising the type of the network resource;

generating a collector based on the identifier corresponding to the network resource;

configuring functionality of the collector for monitoring the network resource based on the type of the network resource;

monitoring the network resource via the collector; and initiating an action in the network based at least in part on the monitoring, the action corresponding to the collector, the network resource, or both.

12. The system of claim 11, further comprising:
dynamically detecting the network resource on the network by probing the network to identify one or more indications of the network resource; and
configuring the collector based on the one or more indications.

13. The system of claim 11, wherein the action comprises displaying one or more metrics corresponding to performance of the network resource to a display device.

14. The system of claim 11, wherein the action further comprises restarting a computing device hosting the network resource, reconfiguring one or more computing resources associated with the network resource, or both.

15. The system of claim 11, further comprising removing the collector.

16. The system of claim 15, wherein removing the collector releases one or more computing resources.

17. The system of claim 15, wherein the collector is removed based on dynamically detecting that the network resource is no longer available.

18. The system of claim 15, wherein the collector is removed based on a change in metrics corresponding to performance of the network resource, based on the identifier being removed from a list of identifiers, based on the identifier being removed from a data source providing the identifier, or a combination thereof.

19. The system of claim 11, further comprising:
determining that a data source associated with the identifier is operating unexpectedly; and
maintaining the collector corresponding to the identifier at least until the data source again operates as expected or until the network resource is determined to not be available.

20. The system of claim 11, wherein configuring functionality of the collector further comprises selecting functionality specific to the type of the network resource, wherein different collector configurations comprising different functionality are selected for different types of network resources.

* * * * *